Patented Jan. 24, 1950

2,495,283

UNITED STATES PATENT OFFICE 2,495,283

POLYMERIC POLYAMINE AND WAX COMPOSITIONS AND ARTICLES TREATED THEREWITH

James H. Werntz, Wilmington, Del., assignor to E. I. du Pont de Nemours & Company, Wilmington, Del., a corporation of Delaware No Drawing. Application May 10, 1948, Serial No. 26,245

9 Claims. (Cl. 260—28)

This invention relates to new compositions of matter and to methods for their preparation. More particularly, this invention relates to water-repellent compositions, to articles and substrates containing such compositions, and to methods for preparing water-repellent compositions and for treating articles therewith.

This invention has as an object to provide new compositions having water-repellent properties. Another object is to provide methods for preparing water-repellent compositions. A further object is to provide water-repellent articles and methods for providing substrates with a water-repellent coating. A still further object is to provide water-repellent textile materials and methods for providing textiles with a water-repellent coating. Other objects will appear hereinafter.

These objects are accomplished by providing new compositions comprising a blend of a wax and a polymeric polyamine which is the reaction product of the reductive-amination of a monoolefin/carbon monoxide polymer.

These polymeric polyamines are derived from monoolefin/carbon monoxide polymers in accordance with the reductive amination procedure disclosed in the copending application of H. H. Hoehn, Serial No. 4932, filed January 28, 1948. They have a main carbon chain and amino-nitrogen groups as lateral substituents with the nitrogen thereof directly attached to a carbon atom which is an integral part of the main carbon chain. These polymeric polyamines may also contain carbonyl carbon in the chain of contiguous carbon atoms comprising the main carbon chain of the polyamine.

In preparing the compositions of this invention the polymeric polyamine is dissolved in an organic solvent or in a dilute aqueous solution of a volatile acid in amount sufficient to give a 0.1 to 30% solution by weight. The wax is added next in amount sufficient to provide a wax:polymeric polyamine weight ratio of 1:5 to 1200:1 and preferably of from 2:1 to 10:1, and the blend is then stirred until a homogeneous mixture is obtained. The resulting composition is then reduced with organic solvent or water to provide a blend containing from 0.5 to 20% wax by weight and preferably from 2 to 8% wax. The wax and polymeric polyamine can also be melted together, preferably in the above ratios, and used as such or the fused blend can be dissolved in organic solvents or the molten blend can be dispersed by stirring into an acid solution. A simple admixture of the wax and polymeric polyamine in the desired proportions can be dissolved in organic solvents to provide a blend of the wax and polymeric polyamine.

The compositions of this invention are useful for the coating and impregnation of all sorts of substrates. They are particularly useful for imparting water-repellency to rigid and non-rigid bibulous substrates and especially to textile materials. The application to the substrate may be carried out by brushing, dipping, or spraying, or by any combination of these methods. After application excess solution is removed, if necessary, and the treated article is heated to between 90° and 180° C., preferably to between 90° and 140° C., for from 5 to 30 minutes to bring about insolubilization of the coating. If desired, the polymeric polyamine may be applied to the substrate either from a solution or dispersion in water or from solution or dispersion in an organic medium and then to the treated substrate there is applied the wax either from solution in an organic solvent or from an aqueous dispersion. On subjecting the treated article to heat treatment the polyamine and wax fuse and blend together, providing the surface with a water-repellent coating. In another modification the polyamine and wax may be heated together to form a homogeneous blend, which is particularly useful for the coating of paper.

Suitable substrates for the application of the compositions of this invention are films, fibers, yarns, fabrics, and other articles made from filaments, fibers, or yarns derived from natural, modified natural, or synthetic polymeric materials or from blends of these. Specific examples are paper, paper pulp, cotton, wool, silk, regenerated cellulose, nylon, polyacrylonitrile, polyethylenes of the type disclosed and claimed in U. S. Patent No. 2,153,553, leather, hemp, sisal, coconut, and the like, films, fabrics, and fibers derived from casein, soya protein, peanut protein, gelatin, hydrolyzed ethylene/vinyl acetate polymers, polyvinyl alcohol, vinyl acetate/vinyl chloride polymers, and the like, fiber-forming linear polyesters, asbestos, cellulose esters and ethers, for example, cellulose nitrate, cellulose acetate, ethyl cellulose, and the like, porous tile, wood, wood pulp, cork, and the like. Dyed and undyed cotton sateen, poplin, broadcloth, jean cloth, gabardine, and like fabrics, are especially adaptable for treatment with the compositions of this invention to produce products possessing not only excellent water-repellency but which are also permanent to dry-cleaning and laundering. The compositions of this invention may also be applied to non-porous substrates, e. g., glass, metals, ceramics, etc.

For use in the treatment of textiles to impart water-repellency the preferred polymeric polyamines are those derived from monoolefin/carbon monoxide polymers having molecular weights in excess of 600 and which have monoolefin:carbon monoxide mole ratios of from 4:1 to 20:1. If desired, ratios higher than 20:1 may be used, for example 40:1. Polymeric polyamines from monoolefin/carbon monoxide polymers having molecular weights of from 1000 to 2000 and containing monoolefin:carbon monoxide mole ratios of from 6:1 to 15:1 are particularly useful for application from aqueous systems because of their ready solubility in dilute aqueous acid solutions and because after curing they are insoluble in dry-cleaning solvents. For application from organic solvents the preferred polymeric polyamines are those derived from monoolefin/carbon monoxide polymers having molecular weights of from 2000 to 12,000.

Since the polymeric polyamines in the form of their salts with volatile organic acids have dispersing properties it is not necessary to employ other deflocculating agents in the preparation of dispersions in aqueous systems. This property is of a transitory nature and hence it is lost upon decomposition of the salt. This is a valuable characteristic because it makes it possible to prepare dispersions without having the deflocculating agent contribute water-sensitivity to the resulting dry film. The polymeric polyamine salts which have been decomposed, as by heat-treatment, are not dispersible in dilute aqueous acid solutions.

The polymeric polyamines containing more than 1% primary amino nitrogen are soluble in 5% aqueous acetic acid while those containing less than 1% primary amino nitrogen are less readily soluble. Other acids may be used in place of acetic acid in preparing salts of the polymeric polyamines, for example, formic, tartaric, citric, propionic, isobutyric, succinic, maleic, malic and the like. Sulfuric, phosphoric, and aryl sulfonic acids may also be employed in preparing salts of the polymeric polyamines as can also halogen acids such as hydrochloric and hydrobromic. In applications involving cellulosic materials, however, the use of strong acids is to be avoided because of the tendering effect which the acid has on the cellulose. The more volatile acids are preferred to the less volatile acids because the salts decompose more readily, and the polymeric polyamine insolubilizes more quickly at a given temperature.

The examples which follow are submitted to illustrate and not to limit this invention. Unless otherwise specified parts are by weight.

*Example I*

A silver-lined, steel reaction vessel is charged with 50 parts of an ethylene/carbon monoxide polymer containing ethylene and carbon monoxide in a mole ration of 6.26:1 and 5 parts of an active nickel hydrogenation catalyst. The vessel is closed, evacuated, and charged with 100 parts of anhydrous ammonia. The reactor is then placed in a shaker machine, and connected to a source of high pressure hydrogen. Hydrogen is expanded into the vessel until the pressure reaches 600 atm. The reactants are then heated to 150° C. and agitated for 15 hours. A pressure range of 950–970 atm. is maintained during this period of reaction. Excess hydrogen and ammonia are bled-off and the mixture of polymeric polyamine and catalyst is discharged. The reaction product is dissolved in toluene and the solution filtered to remove the catalyst. Removal of the toluene from the filtrate by distillation yields 36 parts of a light straw-colored, tacky, soft resin as the nonvolatile residue. This product analyzes 80.49% C, 12.62% H, 4.38% N as determined by the Dumas procedure, and 4.09% N as determined by the Van Slyke procedure. From these data it can be calculated that 68% of the carbonyl groups of the parent polymer are converted to amine groups, and 93% of the nitrogen present in the product is in the form of primary amine.

A solution is prepared by pasting 1 part of the above polymeric polyamine with 96 parts of distilled xylene, adding 3 parts of commercial methylenedistearamide and heating to 95° C. until the solution is clear.

A 9″ x 9″ square of white cotton sateen is impregnated by dipping it in the above solution, squeezing it by passing it through a wringer roll with the pressure adjusted so that the total pick-up of solution is equal to the dry weight of the fabric. The impregnated fabric is allowed to air-dry and is then heated for 10 minutes at 135° C. The treated fabric is found to have an initial water-repellency of 90 and to maintain a spray-rating of 80 after three launderings.

The water-repellency values referred to above and in the subsequent examples are determined by the method described in the Year Book of the American Association of Textile Chemists and Colorists 23, 240–4 (1946).

The laundry tests mentioned above and in subsequent examples are carried out as follows:

The fabric is washed for forty minutes at the starting temperature of 100° C. in a mechanical laundering machine having a reversible cycle, using a washing solution containing 36 parts of soap, 18 parts of sodium carbonate, and 18,000 parts of water and maintaining a total load of 1000 parts. After each laundering the fabric is rinsed in distilled water and after the first, third, and sixth launderings, it is squeezed, allowed to air-dry, and then heated for ten minutes at 135° C., after which spray ratings are determined.

*Example II*

Two and five-tenths parts of a polymeric polyamine containing 4.4% total nitrogen and 4.1% primary amino nitrogen, prepared by the catalytic reductive amination of an ethylene/carbon monoxide polymer having a molecular weight of 1238 and an ethylene/carbon monoxide mole ratio of 6.3:1, were dissolved in 50 parts of water and 0.5 part of glacial acetic acid by stirring at 80° C. for 10 minutes. To the solution there was added 25 parts of molten paraffin wax and the mixture stirred for 10 minutes. Thereafter there was added 40 parts of water with stirring, while holding the temperature at 80° C., and 1.25 parts of a fatty alcohol sulfate dissolved in 5 parts of water.

The above mixture was stirred and permitted to cool to room temperature. Fifty parts of the emulsion thus made was diluted with 117 parts of water to yield a bath containing about 6% paraffin wax. This bath was used to pad undyed cotton sateen fabric. The treated fabric was cured for 10 minutes at 120° C. The cured fabric had an initial spray-rating of 100. The spray-rating after three launderings was 70. Heretofore it was necessary to add polyvalent metal ions such as aluminum to dispersions of waxes in order to provide an initial spray-rating of 100. This example demonstrates that the polymeric polyamines function like polyvalent metal ions and in addition impart permanence to the water-repellency.

Example III

To 50 parts of the concentrated emulsion prepared as described in the first part of Example II there was added 5.5 parts of a 22% solution of basic aluminum formate dissolved in 111 parts of water. This bath was used to impregnate undyed cotton sateen, and the impregnated fabric was then cured 10 minutes at 120° C. The initial rating of the cured fabric was 100 and after three launderings it was 70.

Undyed cotton sateen impregnated with a commercial water-repellent composition containing paraffin wax, glue, and aluminum formate reduced with water to about 6% paraffin wax solids, after curing for 10 minutes at 100° C. had a spray-rating of 100. After three launderings the spray-rating was 0.

Example IV

Two parts of fine particles size (1 to 10 microns) methylenedistearamide was pasted with 1 part of a polymeric polyamine, dissolved in 1 part of glacial acetic acid. This polymeric polyamine analyzed 4.4% total nitrogen and 3.5% primary amino nitrogen, and was made by the reductive amination of an ethylene/carbon monoxide polymer having a molecular weight of 776 and an ethylene/carbon monoxide mole ratio of 6.2:1. To the mixture there was added 10 parts of water and the blend milled until a smooth paste was formed. Thereafter there was added 86 parts of water and the dispersion passed twice through a colloid mill. Undyed cotton sateen was impregnated with the dispersion and the impregnated sateen passed through squeeze rolls to remove excess bath. After curing at 135° C. for 10 minutes the spray-rating of the fabric was determined and found to be 100. The spray-rating after three launderings was found to be 80.

Example V

One part of paraffin wax and three parts of a polymeric polyamine containing 2.9% total nitrogen and 1.9% primary amino nitrogen and made by the reductive amination of an ethylene/carbon monoxide polymer having a molecular weight of 3500 and an ethylene/carbon monoxide mole ratio of 11.3:1, was dissolved in 96 parts of xylene. The solution was used to pad undyed cotton sateen. After curing the treated sateen for 10 minutes at 135° C., spray-rating tests were made and found to be 80. After laundering three times the spray-rating was found to be unchanged.

Example VI

Three parts of a polymeric polyamine prepared by the catalytic reductive amination of an ethylene/carbon monoxide polymer having a molecular weight of 1500 and an ethylene/carbon monoxide mole ratio of 7.5:1 were dissolved in 30 parts of water and 3 parts of glacial acetic acid by heating to 70° C. To the solution there was added 6 parts of molten paraffin wax and the mixture stirred for 5 minutes. Thereafter there was added 18 parts of water with stirring while holding the temperature at 70° C. for 5 minutes. The dispersion was stirred while cooling to room temperature. The dispersion was diluted with water to yield a bath containing about 4% paraffin wax. This bath was used to pad undyed cotton sateen fabric. The treated fabric was cured 10 minutes at 120° C. and had an initial spray-rating of 100. The spray-rating after 6 launderings was 80. The spray-rating after 3 dry-cleanings with Stoddard solvent was 80.

Some of the treated fabric after air drying about an hour was treated with formaldehyde vapors. These fabrics were cured 15 minutes at 100° C. and had an initial spray-rating of 100. The spray-rating after 6 launderings was 80. This demonstrated that very good washfastness was obtained by curing at temperatures obtainable with low-pressure steam.

Example VII

One part of a polymeric polyamine derived from an ethylene/carbon monoxide polymer having a molecular weight of 1370, an ethylene:carbon monoxide mole ratio of 14.2:1, said polymeric polyamine analyzing 2.86 nitrogen (Dumas method) and having a C:N ratio of 34:1, was dissolved in 1 part of glacial acetic acid and the solution pasted with 2 parts of methylenedistearamide and diluted finally with 96 parts of water.

Spun rayon fabric, wool fabric, nylon fabric, polyethylene fiber, polyacrylonitrile fiber, leather, asbestos sheeting, transparent regenerated cellulose sheeting, cork, and unglazed porcelain tile were treated with the dispersion prepared as described above. After removal of excess solution, the treated samples were permitted to air-dry and then cured for 10 minutes at 135° C. The treated samples were found to be water-repellent.

Example VIII

A solution was prepared by dissolving 1 part of the polymeric polyamine of Example VII and 2 parts of paraffin wax in 97 parts of benzene by heating and stirring.

Regenerated cellulose sheeting was impregnated with the solution prepared as described above. The excess solution was permitted to drain off, the treated sheeting air-dried, and thereafter baked for 15 minutes at 100° C. The treated sheeting was rendered water-repellent by this treatment.

Example IX

A 14.7% solution of a polymeric polyamine derived from an ethylene/carbon monoxide polymer having a molecular weight of 1670 and an ethylene/carbon monoxide mole ratio of 9.7:1, said polymeric polyamine containing 3.37% nitrogen (Dumas method), was prepared by adding it with stirring to 16.7% aqueous acetic acid. To this solution there was added, with stirring, enough molten paraffin wax and water to provide a dispersion containing 16% of the wax. Thereafter sufficient sulfur was added with agitation to the dispersion so that when the dispersion was reduced with water to a paraffin wax content of 6%, the sulfur content was 4%.

White cotton sateen and filter paper were impregnated with the above dispersion. After removing excess dispersion, air-drying, and baking for 15 minutes at 100° C. the treated samples were found to have good water-repellency.

A dispersion was prepared as described above, substituting talc for the sulfur. The dispersion was used to impregnate white cotton sateen and filter paper. The treated sateen and filter paper, after air-drying and baking 15 minutes at 100° C., were water-repellent and colored white.

A dispersion was prepared as described above, except that carbon black was substituted for the sulfur. White cotton sateen and filter paper were impregnated with the dispersion. After drying in air and baking for 15 minutes at 100° C., the treated sateen and filter paper were found to have good water-repellency and to be colored black.

Example X

Four parts of fine particle size (1 to 10 microns) methylenedistearamide was stirred with 2 parts of a polymeric polyamine analyzing 2.86% total nitrogen and made by the reductive amination of an ethylene/carbon monoxide polymer having a molecular weight of 1370 and an ethylene/carbon monoxide mole ratio of 14.2:1, dissolved in 2 parts of glacial acetic acid. To the mixture there was added 20 parts of water and the blend milled until a smooth paste was formed. Thereafter there was added 72 parts of water. Undyed cotton sateen was impregnated with the dispersion and the impregnated sateen passed through squeeze rolls to remove excess bath. After curing at 150° C. for 10 minutes the spray-rating of the fabric was determined and found to be 90. The spray-rating after three launderings was found to be 80.

Example XI

Four parts of an ethylene/carbon monoxide polymer melting 79 to 100° C. and containing 2.36% CO was stirred with 2 parts of a polymeric polyamine analyzing 3.87% total nitrogen and 2.6% primary amine nitrogen and made by the reductive amination of an ethylene/carbon monoxide polymer having a molecular weight of 920 and an ethylene/carbon monoxide mole ratio of 7.8:1, dissolved in 2 parts of glacial acetic acid. To the mixture there was added 20 parts of water and the blend milled until a smooth paste was formed. Thereafter there was added 72 parts of water. Undyed cotton sateen was impregnated with the dispersion and squeezed by passing it through a wringer roll with the pressure adjusted so that the total pick-up of bath was equal to the dry weight of the fabric. After curing at 175° C. for 5 minutes the spray-rating of the fabric was determined and found to be 70. The spray-rating did not change after three launderings.

Example XII

Four parts of methylol stearamide was stirred with 8 parts of a 10% polyvinyl alcohol solution. A solution of 2 parts of the polymeric polyamine described in Example XI in 2 parts of glacial acetic acid was stirred in next. The paste was then diluted with a solution of 0.66 part tartaric acid in 87.34 parts of water and the suspension passed once through a colloid mill. Undyed cotton sateen was impregnated by the procedure described in Example XI. After curing at 135° C. for 10 minutes the spray-rating of the fabric was determined and found to be 80. The spray-rating after 3 launderings was found to be 70.

Example XIII

Two parts of a paraffin wax and one part of a polymeric polyamine analyzing 3.37% total nitrogen and made by the reductive amination of an ethylene/carbon monoxide polymer having a molecular weight of 1670 and an ethylene/carbon monoxide mole ratio of 9.7:1 were heated together on the steam bath. A clear, homogeneous solution was formed. Paper was coated with the blend and heated a few minutes at 110° C. The paper was water-repellent and transparent.

Example XIV

A composition was prepared by dissolving in 160 parts of Stoddard solvent 240 parts of a paraffin wax melting at 63–66° C. and one part of a polymeric polyamine derived from an ethylene/carbon monoxide polymer having a molecular weight of 2000 and an ethylene/carbon monoxide mole ratio of 6.8:1, said polymeric polyamine containing 4.17% total nitrogen (Dumas method), 3.56% primary amino nitrogen (Van Slyke method), and an inherent viscosity of 0.19. Three parts of this composition was dissolved in 97 parts of Stoddard solvent and the solution applied to viscose rayon and to cotton gabardine. The treated viscose rayon and cotton gabardine were then ironed. The water repellency of both treated articles was found to be 100. A composition containing the same concentration of wax and solvent but without the polymeric polyamine gave a rating of 80 on both fabrics.

Example XV

A composition containing 1200 parts of a paraffin wax melting at 63–66° C., 800 parts of Stoddard solvent, and one part of the polymeric polyamine of Example XIV was prepared by mixing the ingredients and heating at 70° C. Three parts of the composition was then diluted with 97 parts of Stoddard solvent and the solution then applied to wool crepe and cotton gabardine. For comparison, similar fabrics were treated with the same concentration of the paraffin wax in Stoddard solvent. After ironing, the fabrics were tested for water repellency and found to have the following ratings:

| Paraffin Wax/Polymeric Polyamine | Wool Crepe | Cotton Gabardine |
| --- | --- | --- |
| Paraffin wax/polyamine, 1200:1 | 100 | 100 |
| Paraffin wax alone | 80 | 80 |

A composition prepared as described above, replacing the Stoddard solvent with trichloroethylene, gave similar results on cotton gabardine.

The polymeric polyamines used in the practice of this invention are the products obtained by the reductive amination of monoolefin/carbon monoxide polymers as described in the copending application of H. H. Hoehn, Serial No. 4932, filed January 28, 1948. The monoolefin/carbon monoxide polymers are formed by polymerizing a monoolefin containing up to four carbon atoms or a plurality of said monoolefins with carbon monoxide in the presence of a polymerization catalyst, for example, a peroxy compound as disclosed and claimed in the copending application of M. M. Brubaker, U. S. Serial No. 552,374, filed September 1, 1944 and now abandoned, of which Serial No. 97,908, filed June 8, 1949, is a continuation-in-part.

A typical polymeric polyamine is one prepared as described below:

A silver-lined, steel reaction vessel is charged with 150 parts of dioxane, 50 parts of an ethylene/carbon monoxide copolymer having an intrinsic viscosity of 0.048 and containing ethylene and carbon monoxide in the mole ratio of 4.1:1, and 5 parts of an active nickel hydrogenation catalyst. The vessel is then closed, evacuated and charged with 25 parts of anhydrous ammonia. The reactor is placed in a shaker machine and connected to a source of high pressure hydrogen. Hydrogen is expanded into the reactor and heating and agitation are started. The temperature is raised to 120° C. and the pressure adjusted to 166.7 atm. These conditions are maintained for 5 hours during which time the observed pressure drop is 6.7 atm. The reactor is then allowed to cool, excess hydrogen and ammonia are bled off, and the mixture of solvent, polymeric polyamine, and catalyst is discharged. The reaction product is filtered to remove the catalyst and the filtrate is then subjected to distillation to remove the dioxane. Residual solvent is removed by purging the polymeric polyamine at room temperature under reduced pressure for 6 hours. There is thus obtained 48 parts of a viscous straw-colored resin. This product is partially soluble in 5% aqueous acetic acid and analyzes: 76.41% C, 11.48% H, 2.82% N, as determined by the Dumas procedure, and 1.02% N as determined by the Van Slyke primary amino nitrogen procedure. From these data it may be calculated that 17% of the carbonyl groups of the parent polymer are converted to amine groups and that 36% of the nitrogen present in the product is in the form of primary amine.

In the formulation of the compositions of this invention any synthetic or naturally occurring wax may be used as a modifier for the polymeric polyamine. Examples of suitable waxes are paraffin wax, microcrystalline hydrocarbon waxes, polyethylenes of the type disclosed and claimed in U. S. Patent No. 2,153,553, hydrocarbon waxes obtained by the hydrogenation of oxides of carbon, ethylene/carbon monoxide polymers of the type disclosed and claimed in the co-pending application of M. M. Brubaker, U. S. Serial No. 552,374, filed September 1, 1944, montan wax, carnauba wax, beeswax, polycarboxylic acid-polyhydric alcohol-long chain fatty acid polyesters, formaldehyde condensation products of amides of saturated fatty acids containing from 12 to 22 carbon atoms, for example, methylenedistearamide, methylol stearamide, ethylenedistearamide, ethylenedipalmitamide, methylenedilauramide, methylenedipalmitamide, methylenediarachidamide, methylenedibehenamide, and the like, stearone, dicetylcarbonate, octadecylcycloethyleneurea, dioctadecylurea, thiobis-stearamide, dioctadecyl amine, poly(n-butyl methacrylate), octadecylstearate, and the like. For use in rendering textiles water-repellent, the wax component of the composition should contain at least 25 carbon atoms and preferably be one containing from 30 to 60 carbon atoms. Superior water-repellent effects are obtained with the hydrocarbon waxes and the bis-amides such as methylenedistearamide and these represent preferred classes.

To the blends of wax and polymeric polyamine there may be added ancillary materials, for example, aldehydes. Formaldehyde and glyoxal are especially useful modifiers in water-repellent compositions because through their use improved initial water-repellency as well as permanence to dry-cleaning and laundering is obtained. Furthermore, the use of aldehydes accelerates the insolubilization of the polymeric polyamines and permits curing of the treated textile at temperatures ranging from 20° C. to 100° C. in a relatively short time. The amount of aldehyde usually used is one mole per amino group in the polymer. If desired, however, larger or smaller amounts may be employed. In place of formaldehyde there may be used such derivatives as the methylolureas, methylolmelamine, bis-(methoxymethyl)uron, and the like.

Compositions having valuable water-repellency characteristics may be made by deflocculating a wax, for example, methylolstearamide with polyvinyl alcohol and then diluting the resulting dispersion with a solution of the polymeric polyamine. Such compositions especially when they contain a small amount of hydroxycarboxylic acid such as tartaric acid, impart to textiles superior water-repellency and permanence to laundering and dry-cleaning.

The compositions of this invention per se or with added materials such as pigments, dyes, anti-oxidants, fillers, oils, natural and synthetic resins, asphalts, deflocculating agents, fire-retardants, fungicides, insecticides and the like are useful for the treatment of such fabricated articles as fabrics, paper, paper cartons, marine ropes, fishing leaders, and the like, to impart water-repellency and thus enhance their fields of utility and life.

Liquid aliphatic, cycloaliphatic, and aromatic hydrocarbons are preferred organic solvents for application of the blends of a wax and a polymeric polyamine from solution because of their lower cost. Other organic solvents, such as esters, ethers, ketones, alcohols, etc. such as ethyl acetate, dioxane, diisopropyl ketone, isopropanol, etc. may be employed.

As many apparently widely different embodiments of this invention may be made without departing from the spirit and scope thereof, it is to be understood that this invention is not limited to the specific embodiments thereof except as defined in the appended claims.

I claim:

1. A composition comprising a wax and a polymeric polyamine in the ratio by weight of from 1:5 to 1200:1, said polymeric polyamine being the product obtained by the reductive amination of a polymer of a monoolefin containing from 2 to 4 carbon atoms with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

2. A composition comprising a wax and a polymeric polyamine in the ratio by weight of from 1:5 to 1200:1, said polymeric polyamine being the product obtained by the reductive amination of a polymer of ethylene with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

3. A composition comprising a wax and a polymeric polyamine as set forth in claim 1 in which said wax and polymeric polyamine is contained in an organic solvent.

4. A composition comprising a wax and a polymeric polyamine as set forth in claim 1 in which said wax and polymeric polyamine is dispersed in an aqueous solution of a volatile acid.

5. An article containing a substrate treated with a composition comprising a wax and a polymeric polyamine in the ratio by weight of from 1:5 to 1200:1, said polymeric polyamine being the product obtained by the reductive amination of a polymer of a monoolefin containing from 2 to 4 carbon atoms with carbon monoxide, which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

6. An article having a bibulous substrate treated with a composition comprising a wax and a polymeric polyamine in the ratio by weight of from 1:5 to 1200:1, said polymeric polyamine being the product obtained by the reductive amination of a polymer of ethylene with carbon monoxide in which the mole ratio of ethylene to carbon monoxide is from 4:1 to 40:1, and which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

7. A substrate treated with a composition comprising a wax and a polymeric polyamine in the ratio by weight of from 2:1 to 10:1, said polymeric polyamine being the product obtained by the reductive amination of a polymer of a monoolefin containing from 2 to 4 carbon atoms with carbon monoxide in which the mole ratio of monoolefin to carbon monoxide is from 6:1 to 15:1 and which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

8. A substrate containing a coating comprising a wax and a polymeric polyamine in the ratio by weight of from 2:1 to 10:1, said polymeric polyamine being the product obtained by the reductive amination of a polymer of ethylene with carbon monoxide in which the mole ratio of ethylene to carbon monoxide is from 6:1 to 15:1, and which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

9. A textile material containing a coating comprising a wax and a polymeric polyamine in the ratio by weight of from 2:1 to 10:1, said polymeric polyamine being the product obtained by the reductive amination of a polymer of ethylene with carbon monoxide in which the mole ratio of ethylene to carbon monoxide is from 6:1 to 15:1, and which polymeric polyamine has a main carbon chain and amino nitrogens attached solely to members of the class consisting of hydrogen and hydrocarbon as lateral substituent groups with the nitrogen thereof directly attached to a carbon atom which is an integral part of said main carbon chain.

JAMES H. WERNTZ.

No references cited.